Dec. 14, 1937.                A. M. McLEOD                2,102,430
                               GREASE TRAP
                           Filed July 23, 1936
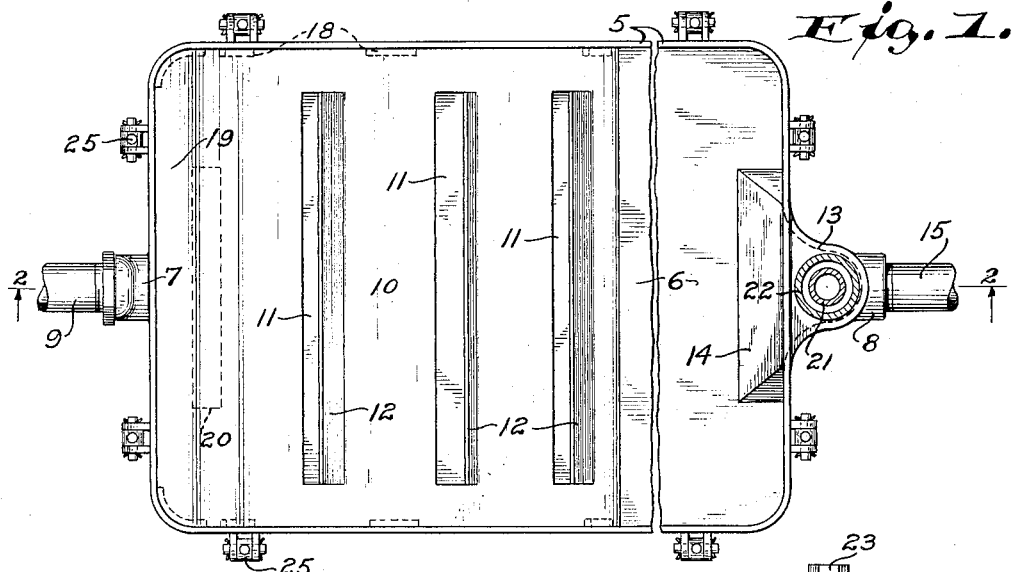
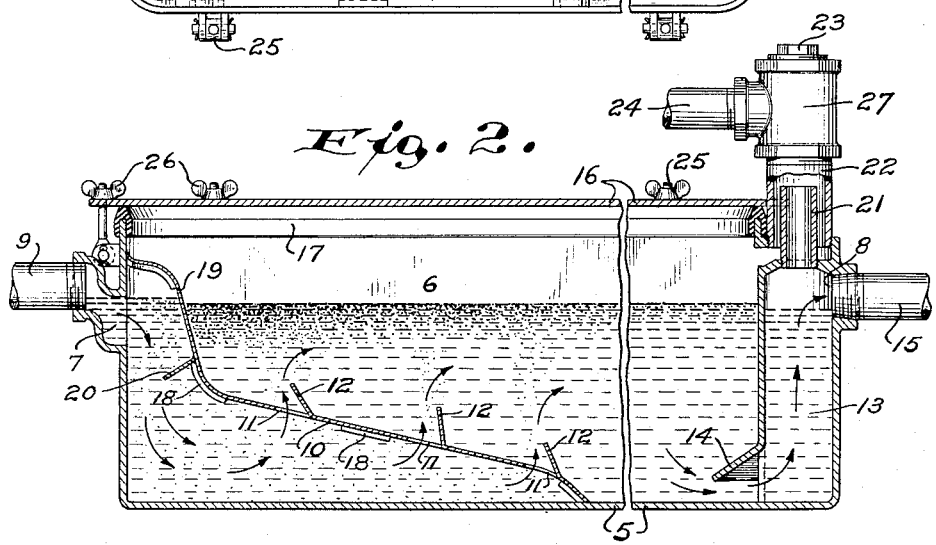
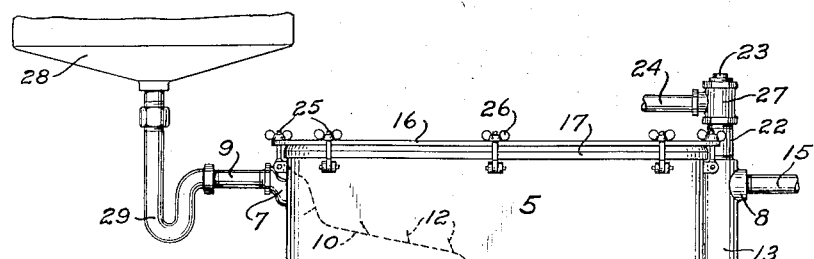
INVENTOR.
Arthur M. McLeod
BY Morsell, Lieber & Morsell
ATTORNEYS Patented Dec. 14, 1937

2,102,430

UNITED STATES PATENT OFFICE 2,102,430

GREASE TRAP

Arthur M. McLeod, Madison, Wis., assignor to D. J. Murray Manufacturing Co., Wausau, Wis., a corporation of Wisconsin Application July 23, 1936, Serial No. 92,096

12 Claims. (Cl. 210—56)

The present invention relates generally to improvements in the art of separating materials having different specific gravity, and relates more specifically to improvements in the construction and operation of so-called traps for separating relatively buoyant from heavier liquids.

Generally defined, an object of the present invention is to provide an improved gravity separator for normally mixed liquids having different density, which is simple and compact in construction, and which is moreover automatic and highly efficient in operation.

Many types of traps have heretofore been proposed and used for the purpose of constantly separating oily liquid such as grease from a mixture of grease and water or other heavier liquid; and in my prior application Serial No. 88,729, filed July 3, 1936, I have shown a rather efficient automatic grease trap having a wide separating chamber of considerable depth and a substantially upright dam within the chamber intermediate its inlet and outlet ends, the dam being provided with a series of horizontally elongated by-pass openings beneath its crest and each opening having a louver or plate projecting from the lower portion thereof for the purpose of directing the by-passed mixture upwardly toward the top of the separating basin. While this prior grease trap is highly efficient where an abundant space and especially head room is available and where relatively large separating capacity is desired, it has been found that with lesser available space and smaller quantities of grease laden liquid more effective separation may be produced with a shallower and therefore a more compact trap assemblage, but that the formation of the dam should preferably be somewhat modified in order to insure most efficient separation of the grease from the other liquid in such a shallow trap.

It is therefore a more specific object of the present invention, to provide an improved grease trap assemblage of relatively low height, which utilizes some of the principles of operation of my prior trap, but which will insure most effective separation of the grease and other liquid in a shallow separating basin.

Another specific object of my present invention is the provision of an improved partition or dam structure for grease traps or the like, which will permit gradual and quiescent flow of liquid through a trap at sufficiently low velocity so as to insure separation of even minute particles of oil and grease from the water or other heavier liquids.

A further specific object of the invention is to provide a new and useful separator unit especially adapted for the treatment of waste liquids from sinks, dish-washers, and other washing machines, which is extremely simple in construction, which may be readily installed in relatively small space, and which is conveniently accessible for inspection and cleaning.

Still another object of my invention is to provide an improved grease trap which is properly vented and dependable in operation, and which may be manufactured and installed at moderate cost.

The above as well as other specific objects and advantages will be apparent from the following detailed description.

A clear conception of embodiments of the features which constitute the present improvement, and of the construction and operation of an improved grease trap built in accordance with this invention, may be had by referring to the drawing accompanying and forming a part of this specification wherein like reference characters designate the same or similar parts in the various views.

Fig. 1 is a fragmentary top view of one of my improved grease traps with the cover removed so as to reveal normally enclosed structure;

Fig. 2 is a similarly fragmentary central vertical longitudinal section through the trap, taken along the line 2—2 of Fig. 1; and Fig. 3 is a side elevation of the improved trap unit, showing the same applied to a typical separating installation.

While the present improvement has been shown herein by way of illustration, as having been embodied in a relatively small and shallow trap unit especially adapted for the purpose of removing oily substances such as grease from the waste liquid delivered from a sink, it is not the intent to thereby unnecessarily restrict the scope, since the novel principles of operation may obviously be more generally applied to other sizes and types of traps; and some of the improved features of grease trap construction which may be shown but are not specifically claimed herein, constitute no part of my present improvement.

In the grease trap specifically illustrated in the drawing, the separating unit comprises in general a main casing 5 of relatively great width and of any desired length forming a rather shallow separating chamber 6 having a centrally disposed mixed liquid inlet opening 7 at one end and a similarly centralized separated liquid outlet opening 8 at the upper portion of the opposite end thereof; a mixed liquid supply pipe 9 communicating with the inlet opening 7; an inclined partition or dam 10 disposed within the chamber 6 near the inlet opening 7 and having a series of transverse slots or openings 11 therethrough, each of which is provided with an upwardly extending deflector plate or louver 12; a liquid delivery conduit 13 extending from the bottom of the discharge end of the chamber 6 remote from the dam 10 to the upper outlet opening 8 and having a shield or apron 14 projecting into the chamber 6 toward the bottom of the casing 5; a discharge pipe 15 for the separated liquid communicating with the outlet opening 8; a vent assemblage associated with the casing 5 above the conduit 13; and a removable cover 16 cooperable with the top of the casing 5 through a sealing element 17.

The main casing 5 may be formed of suitable metal and in any desired manner, and this casing is ordinarily formed relatively wide and shallow, but may be of any suitable length. The chamber 6 within the casing 5 is relatively unobstructed except for the dam 10, and thus affords a relatively large collecting basin for the separated grease. The inlet opening 7 may be located at any suitable distance from the bottom of the casing 5 and need not necessarily be located at the top of the casing as shown, and the opposite side walls of the casing 5 may be provided with ledges or lugs 18 for removably supporting the dam 10. The dam 10 which is formed of suitable material such as sheet metal or casting, may rest loosely upon the lugs 18 or may be detachably secured to the casing 5; and this dam preferably has an integral hood 19 extending over the inlet opening 7 and also carries a deflector plate 20 located below the inlet opening and extending toward the inlet wall of the casing 5 so as to deflect the entering mixture away from the dam 10 and to simultaneously spread the same laterally thereby materially reducing its velocity. While the hood 19 and plate 20 are shown as being formed integral with or permanently attached to the dam 10, these elements may obviously be made separate from the dam. The slots or through openings 11 are located at different levels and in series along the lower portion of the inclined dam 10, and preferably extend throughout the greater portion of the width of the dam. The louvers 12 which may be formed integral with or detachable from the dam 10, may be disposed at any desired angle relative to the adjacent openings 11, but are preferably located so as to direct the flow upwardly through the separating basin and away from the riser conduit 13, as illustrated in Fig. 2.

The delivery conduit 13 may be disposed within or outside of the casing 5, and the outlet opening 8 at the upper end of this conduit establishes the liquid level within the chamber 6. The deflecting apron 14 at the lower end of the conduit 13 is preferably located as far as possible away from the dam 10 so as to provide for the maximum separating period, and the upper end of the conduit 13 is provided with an upwardly extending vent tube 21 which projects above the top of the casing 5 and is disposed concentrically of and within a main vent pipe 22. The main vent pipe 22 is secured to the main casing 5 above the conduit 13 and communicates directly with the chamber 6, but is so located that it does not interfere with the cover 16 and sealing element 17. A T-fitting 27 which is secured to the upper end of the vent pipe 22 has a clean-out plug 23 disposed in line with the tube 21 and pipe 22, and also has a gas exhaust connection 24. The closure cover 16 may be removably attached to the casing 5 by means of bolts 25 and clamping nuts 26, and when the cover is clamped in position, the element 17 prevents escape of gases from the chamber 6 excepting through the vent.

The unit above described, may be installed as shown in Fig. 3, in conjunction with an ordinary sink 28 having the usual outlet trap 29 to which the inlet pipe 9 may be directly attached. In such a system, the trap 29 will effectively prevent escape of gases from the grease trap through the inlet opening 7 when no liquid is being delivered to the trap, and the supply pipe 9 may be located above the normal liquid level within the chamber 6 as illustrated in order to maintain this pipe drained free from liquid during periods of no flow and to thus prevent possible accumulation of grease in the pipe 9. If, however, no outside trap 29 is provided, it is preferable to lower the inlet opening 7 to a point below the normal liquid level within the separating chamber 6, so that the liquid in the separating basin will serve as a trap to prevent escape of gases by maintaining the supply pipe 9 filled with liquid at all times while the grease separator is in use.

During normal operation of the improved grease trap, the unit may be installed as shown in Fig. 3, whereupon the grease laden mixture delivered from the sink 28 through the trap 29 flows through the inlet pipe 9 and opening 7 into the casing 5 beneath the hood 19. When the entering mixture of grease and water strikes the hood 19 and the spreader plate 20 the flow is diverted laterally and downwardly and the velocity of flow is materially reduced. The mixture subsequently advances beneath the dam 10 toward the outlet end of the casing 5, and the grease laden liquid is caused to gradually advance upwardly through the openings 11 into the separating chamber 6. The gently rising streams of the mixture are somewhat deflected by the louvers 12, and flow over the crests of these louvers slowly and without agitation, so that most of the grease particles will quickly rise and collect at the top of the separating basin. The grease particles which do not immediately separate, are caused to flow through the relatively wide separating basin toward the delivery conduit 13 at low velocity, and eventually are urged downwardly toward the apron 14. During this travel, the buoyant residual grease particles, due to their relatively low specific gravity and the affinity of the accumulated grease at the top of the chamber 6, will separate from the carrying liquid and will rise to the top, so that only clear liquid will ultimately be delivered to the conduit 13 beneath the apron 14. This separated liquid finally flows through the conduit 13 and may be conducted away from the grease trap through the discharge pipe 15, while the gases escaping from the separating basin and from the liquid in the conduit 13 are free to pass to the pipe 24 through the vent pipe 22 and the tube 21 respectively, thereby preventing disturbances of the separating basin by siphonage or pressure variations. It will be noted that the separation or removal of the grease from the liquid is thus effected automatically whenever grease laden liquid is supplied to the trap, and is efficiently accomplished because of the fact that undesirable disturbances and turbulency in the flow are entirely eliminated in the separating chamber, while the flow is maintained substantially uniform and of low velocity. The accumulated grease, as well as the liquid and residue, may be periodically removed from the trap upon removal of the cover 16, by merely releasing the wing nuts 26, and when the cover 16 has been removed, the dam 10 may also be quickly withdrawn from its supporting lugs 18. In case the hood 19 is formed separate from the dam 10, it may also be readily removed from its normal supports.

From the foregoing description, it will be apparent that my present invention provides an extremely simple and compact grease trap assemblage which is entirely automatic and highly efficient in normal operation. The special formation of the dam 10 is of considerable importance especially in relatively shallow traps adapted for installation where the head room is limited, as this special dam construction will insure most effective separation of grease particles under such low head conditions. Each of the louvers 12 serves as an independent wier, and the crests of these successive wiers are located at different levels so that the several streams of liquid passing through the openings 11, will travel as layers and will produce stratification of the flow through the major portion of the separating basin. The flow of liquid through the several openings 11 is thereby impeded by the flow through other openings, and a practically uniform flow of liquid through the trap is maintained at all times regardless of the accumulation of grease in the separating chamber 6. The vent assembly at the discharge end of the trap permits free independent venting of the chamber 6 and of the conduit 13, and this vent assembly in no manner interferes with access to the interior of the trap upon removal of the cover 16. The apron 14 serves to gradually conduct the removed liquid from the separating chamber without introducing undesirable agitation or turbulency, and the hood 19 and conduit 13 permit gradual decrease and increase respectively in the velocity of flow without affecting the condition of the liquid within the separating basin. The openings 11 and baffles 12 introduce the liquid into the separating basin over a relatively large area, thus admitting the streams of liquid at desirably low velocities and without turbulency or agitation, thereby insuring maximum efficiency in separation at low heads. The improved assemblage obviously occupies minimum space, considering the capacity of the trap, and may be constructed and installed at very low cost. It should also be noted that the improved trap may obviously be used for the separation of fluent materials other than grease and water, and that the dimensions and shapes of the various parts may be altered to suit different conditions of operation and use.

It should be understood that it is not desired to limit this invention to the exact details of construction and to the precise mode of operation herein shown and described, for various modifications within the scope of the claims may occur to persons skilled in the art.

I claim:—

1. A grease trap comprising, means forming a separating chamber having an inlet and an outlet, and a dam spanning said chamber and having a series of through openings located progressively nearer said outlet, each of said openings having a wall for deflecting the flow through the opening upwardly therefrom.

2. A grease trap comprising, means forming a separating chamber having an inlet and an outlet, and a dam spanning said chamber and having a series of through openings located progressively nearer said outlet, each of said openings having a louver extending into said chamber.

3. A grease trap comprising, means forming a relatively large separating chamber having a restricted inlet and a similarly restricted outlet, and a dam spanning said chamber between said inlet and said outlet and having a series of elongated through openings located out of vertical alinement with each other, each of said openings having means for deflecting the flow through the opening upwardly therefrom.

4. A grease trap comprising, means forming a relatively large separating chamber having a restricted inlet and a similarly restricted outlet, a dam spanning said chamber between said inlet and said outlet and having a series of elongated through openings located out of vertical alinement with each other, and a louver extending upwardly away from said dam adjacent to each of said openings.

5. A grease trap comprising, means forming a relatively large separating chamber having a restricted inlet and a similarly restricted outlet, a dam spanning said chamber between said inlet and said outlet and having a series of elongated through openings located out of vertical alinement with each other, and a louver extending upwardly away from said dam adjacent to each of said openings, each of said louvers being inclined over the adjoining opening.

6. A grease trap comprising, a casing forming a separating chamber having an inlet at one end and an outlet at the opposite end thereof, an inclined dam having a hood extending upwardly over said inlet opening and having a series of transverse elongated through openings remote from said hood, and a louver projecting upwardly into said chamber from said dam adjacent to each of said openings.

7. A grease trap comprising, a casing forming a separating chamber having an inlet at one end and an outlet at the opposite end thereof, an inclined dam having a hood extending upwardly over said inlet opening and having a series of transverse elongated through openings remote from said hood, a louver projecting upwardly into said chamber from said dam adjacent to each of said openings, and a deflector shield associated with said dam in advance of said openings.

8. A grease trap comprising, a casing forming a relatively wide and shallow separating chamber having an inlet and an outlet, an inclined dam spanning said chamber between said inlet and said outlet and having a series of elongated parallel through openings therein, a louver projecting upwardly from said dam into said chamber adjacent to each of said openings, a hood extending from the upper end of said dam toward and above said inlet, and a deflector shield associated with said dam below said inlet and in advance of said openings.

9. A grease trap comprising, a casing forming a separating chamber having an inlet and an outlet, an inclined dam spanning said chamber and extending from an end wall of said casing above said inlet to the bottom of the casing remote from said inlet, said dam having a series of through openings located out of vertical alinement with each other, and a louver extending upwardly away from said dam adjacent to each of said openings and being inclined over the adjoining opening.

10. A grease trap comprising, a casing forming a separating chamber having an inlet and an outlet, and a dam spanning said chamber and having a series of laterally elongated through openings located progressively nearer said outlet, each of said openings having a louver extending into said chamber and inclined over the adjoining opening.

11. A grease trap comprising, a casing forming a relatively long and shallow separating chamber having an inlet and an outlet, and an inclined dam spanning said chamber and extending upwardly from the bottom of said casing toward and above said inlet, said dam having a series of laterally elongated through openings located progressively nearer said outlet and each having a louver extending upwardly into said chamber and inclined over the adjoining opening.

12. A grease trap comprising, a casing forming a relatively long and shallow separating chamber having an inlet and an outlet, and an inclined dam spanning said chamber and extending upwardly from the bottom of said casing toward and above said inlet, said dam having a series of laterally elongated through openings located progressively nearer said outlet and each having a louver extending upwardly into said chamber.

ARTHUR M. McLEOD.